UNITED STATES PATENT OFFICE.

JOHN B. KUNKEL, OF CATOCTIN FURNACES, MARYLAND.

IMPROVEMENT IN PROCESSES OF ELIMINATING PHOSPHORUS FROM IRON.

Specification forming part of Letters Patent No. 182,371, dated September 19, 1876; application filed August 7, 1876.

*To all whom it may concern:*

Be it known that I, JOHN B. KUNKEL, of Catoctin Furnaces, Frederick county, Maryland, have invented certain new and useful Improvements in Processes for Eliminating Phosphorus from Iron; and I hereby declare the same to be fully described, as follows:

My invention relates to processes of purifying iron from the phosphorus which has heretofore been practically inseparable from it, and producing in a cheap and simple manner iron free from any tendency to "cold-shortness" when caused by the presence of phosphorus, and admirably adapted for use in the Bessemer converter; and the said invention consists in the abstraction of the phosphorus from the iron by means of magnesian compounds in the manner and under the conditions hereinafter more fully set forth, and is applicable alike to the production of iron free from phosphorus direct from the ore, and to the purification of pig iron, the rationale of my process consisting in taking advantage of the great affinity exhibited by phosphorus for magnesia, which affinity seems not to be disturbed by any possible elevation of temperature.

In carrying out my invention I proceed as follows: When operating upon phosphatic ores I use, instead of the ordinary limestone flux, dolomite, or magnesian limestone, a well-known double carbonate of lime and magnesia. The charges of ore, carbonaceous matter and dolomite are fed into the ordinary blast-furnace in the usual way, the proportions of ingredients being substantially the same as when ordinary limestone is used as a flux, and governed by like conditions, namely, the relative amounts of oxide of iron, silica, and lime naturally in the ore. Should the ore be extraordinarily phosphatic it is advisable to increase the charge of dolomite from ten to one hundred per cent. A portion of the dolomite may be introduced through the tuyeres.

The working of the furnace being, under the above conditions, in nowise different from the ordinary practice, and being well understood by those practicing the art, need not further be adverted to.

When operating upon metallic iron to eliminate its phosphorus I apply the dolomite either in the cupola or puddling-furnace, as follows: I charge first into the cupola a quantity of coarsely-ground dolomite sufficient to form a layer from two to ten inches deep, and then charge the fuel and pig-iron in proper proportions for melting, so that the iron, as melted, will pass through the dolomite, whereby it is purified from all estimable amounts of phosphorus.

When used in the puddling-furnace I apply the dolomite directly to the charge of pig-iron in quantities varying according to the amount of phosphorus in the iron from ten to fifty per cent. of the weight of the iron, so that in the process of "boiling" the iron is thoroughly brought into contact with the dolomite. I also "fettle" or "fix" the sides and bottom of the furnace with a mixture of iron ore and dolomite in about the proportions of four of ore to one of dolomite, the mass being speedily bound by the slag and forming a durable and excellent fix, and one, moreover, which acts chemically upon the molten charge to purify it.

Having thus described my invention, what I claim as new, and desire to secure by Letters Patent, is—

1. The process, herein described, of eliminating phosphorus from iron, the same consisting in reducing the oxide of iron to the metallic state in presence of dolomite, substantially as described.

2. The process, herein described, of purifying metallic iron and eliminating phosphorus therefrom, the same consisting in treating the molten metal with dolomite, substantially as described.

J. B. KUNKEL.

Witnesses:
RICHD. D. WILLIAMS,
GEORGE J. POPPLEIN.